(12) United States Patent
Chauvel et al.

(10) Patent No.: US 6,430,664 B1
(45) Date of Patent: *Aug. 6, 2002

(54) DIGITAL SIGNAL PROCESSOR WITH DIRECT AND VIRTUAL ADDRESSING

(75) Inventors: Gérard Chauvel, Antibes; Serge Lasserre, Frejus; Dominique Benoît Jacques d'Inverno, Villeneuve Loubet, all of (FR)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/434,606

(22) Filed: Nov. 5, 1999

(30) Foreign Application Priority Data

Apr. 22, 1999 (EP) .............................................. 99401022

(51) Int. Cl.$^7$ .............................................. G06F 12/00
(52) U.S. Cl. ........................ 711/168; 711/149; 711/206; 712/215
(58) Field of Search .................................. 711/206, 131, 711/149, 168; 714/768; 712/23–24, 215

(56) References Cited

U.S. PATENT DOCUMENTS

| | | | | |
|---|---|---|---|---|
| 5,165,028 A | * | 11/1992 | Zulian | 711/3 |
| 5,325,508 A | * | 6/1994 | Parks et al. | 711/118 |
| 5,438,670 A | * | 8/1995 | Baror et al. | 711/3 |
| 5,455,834 A | * | 10/1995 | Chang et al. | 714/768 |
| 5,666,509 A | | 9/1997 | McCarthy et al. | 711/206 |
| 5,822,603 A | | 10/1998 | Hansen et al. | 395/800.01 |
| 5,835,962 A | * | 11/1998 | Chang et al. | 711/206 |
| 5,933,844 A | * | 8/1999 | Young | 711/3 |

* cited by examiner

*Primary Examiner*—Do Hyun Yoo
*Assistant Examiner*—Nasser Moazzami
(74) *Attorney, Agent, or Firm*—Ronald O. Neerings; Wade James Brady, III; Frederick J. Telecky, Jr.

(57) ABSTRACT

A DSP (10) accesses internal memory using physical addresses and has a internal MMU (19) which allows the DSP (10) to work with a large virtual address space mapped to an external memory (20). The MMU (19) performs the translation between a virtual address and the physical address associated with the external memory (20). The MMU (19) includes a translation lookaside buffer (28) and walking table logic (32) for translating virtual addresses to physical addresses.

22 Claims, 4 Drawing Sheets

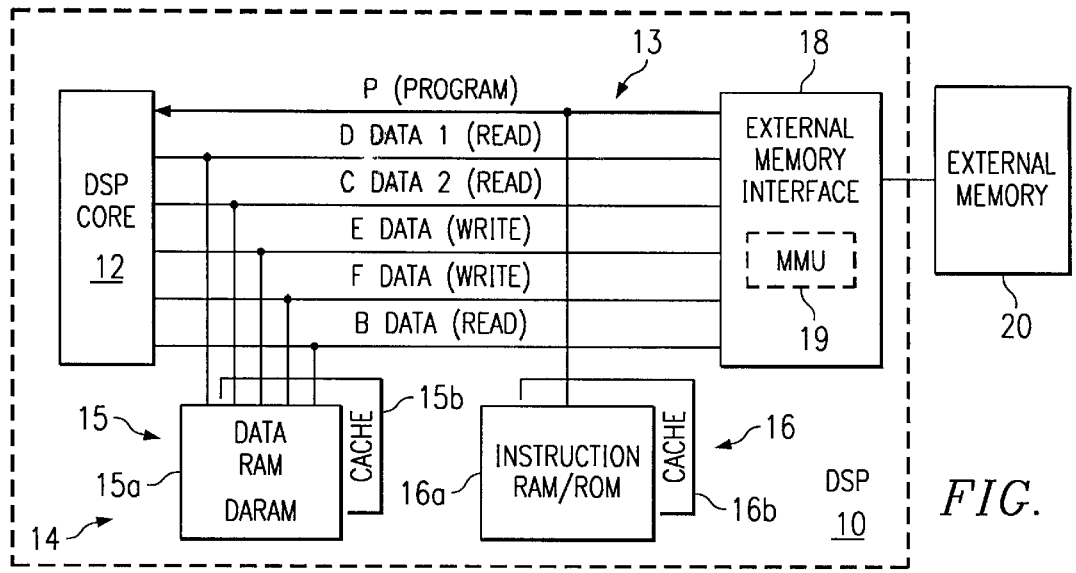

FIG. 1

| ACCESS TYPE | ID | Pa | Ba | Ca | Da | Ea | Fa | P | B | C | D | E | F |
|---|---|---|---|---|---|---|---|---|---|---|---|---|---|
| INSTR BUFFER LOAD | 1 | X | | | | | | X | | | | | |
| PROGRAM READ | 2 | | | | X | | | | | | X | | |
| DATA SINGLE READ | 3 | | | | X | | | | | | X | | |
| PERIPH READ | 4 | | | | X | | | | | | X | | |
| PROGRAM WRITE | 5 | | | | | X | | | | | | X | |
| DATA SINGLE WRITE | 6 | | | | | X | | | | | | X | |
| PERIPH WRITE | 7 | | | | | X | | | | | | X | |
| PROGRAM LONG READ | 8 | | | | X | | | | | X | X | | |
| DATA LONG READ | 9 | | | | X | | | | | X | X | | |
| REGISTERS PAIR LOAD | 10 | | | | X | | | | | X | X | | |
| PROGRAM LONG WRITE | 11 | | | | | X | | | | | | X | X |
| DATA LONG WRITE | 12 | | | | | X | | | | | | X | X |
| REGISTERS PAIR WRITE | 13 | | | | | X | | | | | | X | X |
| DATA DUAL READ | 14 | | | X | X | | | | | | X | X | |
| DATA DUAL WRITE | 15 | | | | | X | X | | | | | X | X |
| DATA SINGLE READ/ DATA SINGLE WRITE | 16 | | | | X | X | | | | | X | X | |
| DATA LONG READ/ DATA LONG WRITE | 17 | | | | X | X | | | | X | X | X | X |
| DUAL READ/COEF READ | 18 | | X | X | X | | | | X | X | X | | |

FIG. 3

DIGITAL SIGNAL PROCESSOR WITH DIRECT AND VIRTUAL ADDRESSING

BACKGROUND OF THE INVENTION

1. Technical Field

This invention relates in general to electronic circuits and, more particularly, to digital signal processors.

2. Description of the Related Art

The global market for digital signal processors (DSPs) has grown at a compounded rate of more than 30 percent per year since 1988. In fact, the market for DSPs is actually developing along a faster track than the one the microprocessor followed in the 1980s and 1990s. In part, this fast-track growth is driven by the fact that digital signal processors target a broader range of diverse end use products than microprocessors: not just personal computers, but also telecommunication devices, consumer electronics, office equipment, industrial controls and automotive components.

The success of DSPs in the marketplace is largely due to their ability to crunch vast quantities of numbers, while racing against an incredibly demanding clock. Digital signal processors are much faster (often 10 times faster or more) than general-purpose microprocessors, which makes digital signal processors particularly well-suited to handle the demands of processing information from different parts of our world by working in real time.

One shortcoming of DSPs is that their functionality is limited by the amount of their internal memory. While improvement in semiconductor fabrication have increased the amount of memory which can be placed on a DSP, the complexity of the applications has increased the need for instruction and data memory even more so.

In the future, applications executed by DSPs will be more complex and will likely involve multiprocessing by multiple DSPs in a single system. DSPs will evolve to support multiple, concurrent applications, some of which will not be dedicated to a specific DSP platform, but will be loaded from a global network such as the Internet. These DSP platforms will require a RTOS (real time operating system) to schedule multiple applications and to support memory management to share and protect memory access efficiently between applications and operating system kernels.

Accordingly, a need has arisen for a DSP capable of memory management, including the accessing large amounts of memory.

BRIEF SUMMARY OF THE INVENTION

In the present invention, a digital signal processor is provided which includes an interface for connecting to an external memory, a processing core and a memory management unit coupled to the interface and the processing core. The memory management unit receives virtual addresses from the processing core and translates the addresses to physical addresses associated with said external memory.

The present invention provides significant advantages over the prior art. Virtual addressing allows the DSP to work with a large address space on a local memory and an external memory which can be shared with other processing units.

BRIEF DESCRIPTION OF THE SEVERAL VIEW OF THE DRAWINGS

For a more complete understanding of the present invention, and the advantages thereof, reference is now made to the following descriptions taken in conjunction with the accompanying drawings, in which:

FIG. 1 illustrates a block diagram of DSP coupled to an external main memory;

FIG. 3 illustrates a table showing different bus usages for the DSP of FIG. 2;

DETAILED DESCRIPTION OF THE INVENTION

Figure 2:
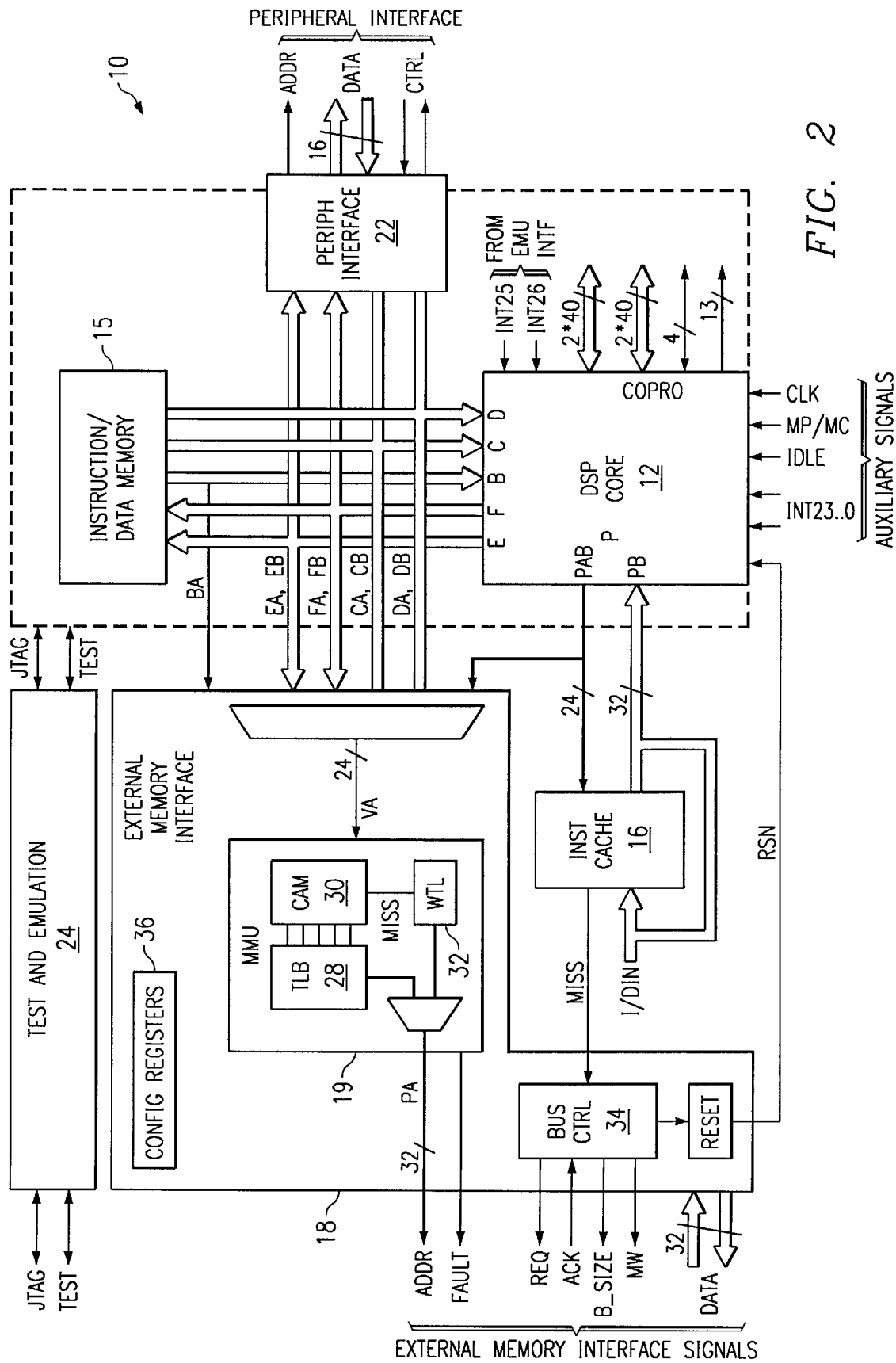
FIG. 2 illustrates a block diagram of the DSP of FIG. 1.

The present invention is best understood in relation to FIGS. 1–6 of the drawings, like numerals being used for like elements of the various drawings.

FIG. 1 illustrates a general block diagram of an improved DSP architecture. In this embodiment, the DSP 10 includes a processing core 12, and a plurality of buses 13 coupled to local memory 14, including a data memory (RAM 15a and/or data cache 15b) along with instruction memory 16 (RAM/ROM 16a and/or instruction cache 16b). An external memory interface 18, including MMU (memory management unit) 19 is coupled to buses 13 and to an external physical memory 20. Other devices in a circuit incorporating the DSP 10, such as a microprocessor, may also use the external memory 20.

In operation, the processor core 12 can be of any design. Typically, the processing core of a DSP features a high speed multiplier accumulator circuit (commonly referred to as a "MAC"). The local memory 14 stores data and instructions used in DSP operations. In the illustrated embodiment, the processing core 12 can directly address the local memory 14 using virtual addressing for high speed access. The bus structure is designed to efficiently retrieve and store program and data information; however, different bus structures could also be used. Alternatively, the local memory 14 could be addressed through an MMU, although this would reduce the speed of local memory addresses.

The external memory interface 18 provides the DSP 10 with the ability to use virtual addressing to access the external memory 20. DSP core 12 always accesses the external memory through the MMU 19. DSPs typically include one or more address generation units (AGUs) to perform one or more address calculations per instruction cycle, in order to retrieve instructions and to retrieve and store operands.

The ability to use virtual addressing significantly increases the functionality of a DSP. In particular, a DSP which has the ability to use virtual addressing has access to large memory spaces for programs and data.

The cache memories 15b and 16b cache data and instructions from the external memory 20. Many different cache architectures, such as direct map, two-way set associative or a combined RAM and cache solution, can be used to implement the cache memory 16, as would be known to one skilled in the art.

A more detailed description of an embodiment for the DSP is shown in FIG. 2. In addition to the DSP core 12, local data memory 15, local instruction memory 16 and external memory interface 18, the DSP includes a peripheral interface 22 and a test and emulation interface 24. The external memory interface 18 includes an MMU 19 with a translation lookaside buffer (TLB) 28, including a content addressable memory (CAM) 30, and walking table logic (WTL) 32. The external memory interface 18 further includes a bus controller 34, and configuration registers 36.

In operation, the DSP 10 communicates via four interfaces. The external memory interface provides thirty two bits (byte) address capability for burst or single accesses to an external memory space shared between DSP program and data (and with other processing units). A DSP peripheral interface allows access to peripherals in I/O space. An auxiliary signals interface regroups reset, clock and interface signals. A test and emulation interface allows test signals and JTAG signals for testing the DSP 10.

The external memory interface 18 controls data and instruction transfers between the DSP 10 and an external memory 20. The external memory interface 18 performs two functions: (1) external memory management, (2) priority handling between multiple DSP buses (labeled C, D, E, F, and P) for external access and cache fill requests.

FIG. 3 illustrates the use of the different buses for each type of instruction from the DSP core 12.

Figure 4:
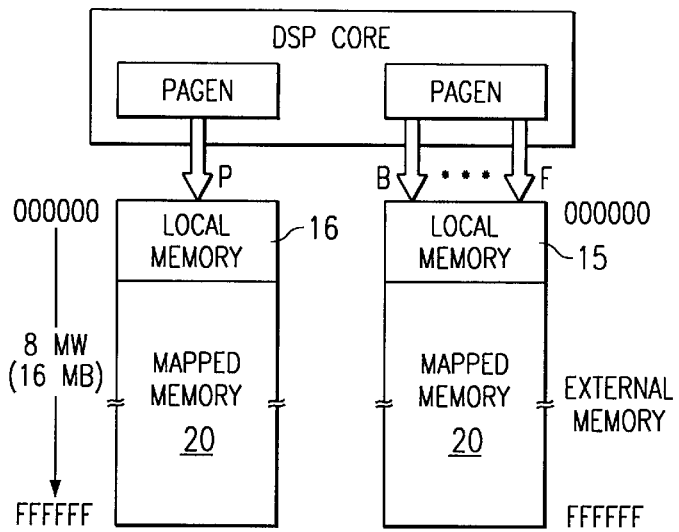
FIG. 4 illustrates program and data spaces for the DSP of FIG. 2.

FIG. 4 illustrates the virtual program and data space. In the illustrated embodiment of FIG. 4, the core 12 sees a uniform 16 Mbyte virtual program space accessed through the P bus. The core 12 accesses 16 Mbytes of contiguous virtual data space through B, C, D, E, F buses, each bus providing its own word address (23 bits). An additional low order bit enables the selection of a byte in a 16 bit word. A high order D/P bit indicates whether the word is associated with program or data, where data and program buses are multiplexed to an external memory. All buses 13 are 16 bits wide. Sixteen KWords of dual access data RAM (the local data memory 15*a*) are mapped at the low-end of the address range. The local program memory 16 mapped at the low-end of the program address range can be a RAM/ROM or a cache for storing information (program and data) from the external memory 20.

In the illustrated embodiment, the processing core 12 can directly address the local memory 14 (i.e., without using the MMU 19) within the 16 Mbyte virtual address space for high speed access. External memory 20 is accessed through the MMU 19 in the external memory interface 18.

It should be noted that throughout the specification, specific architectural features and detailed sizes for various memories, bus capacities, and so on, are provided, although the design for a particular DSP implementation could be varied. For example, the size of the virtual program space seen by the core 12 is a design choice which easily be varied as desired for a specific DSP.

The external memory interface 18 is a 32 bit interface and it generates six types of accesses: (1) single sixteen data read (word), single 32 bit data read (long word), (2) data burst read m×16 bit data, n×32 bit (long word), (3) data write from DSP (single 16 bit, single 32 bit), (4) data burst write (m×16 bit data, n×32 bit), (5) instruction cache line fill and (6) single instruction fetch. If the DSP has a data cache 15*b*, a data cache line fill is also supported.

The priority scheme is defined to match DSP software compatibility and avoid pipeline, memory coherency and lockup issues. The priority list is, in the illustrated embodiment, from highest to lowest: (1) E requests, (2) F requests, (3) D requests, (4) C requests and (5) Cache fill/instruction fetch requests. To improve DSP data flows to/from external memory, blocks of sequential data can be transferred in burst by configuring the external memory interface.

Figure 5:
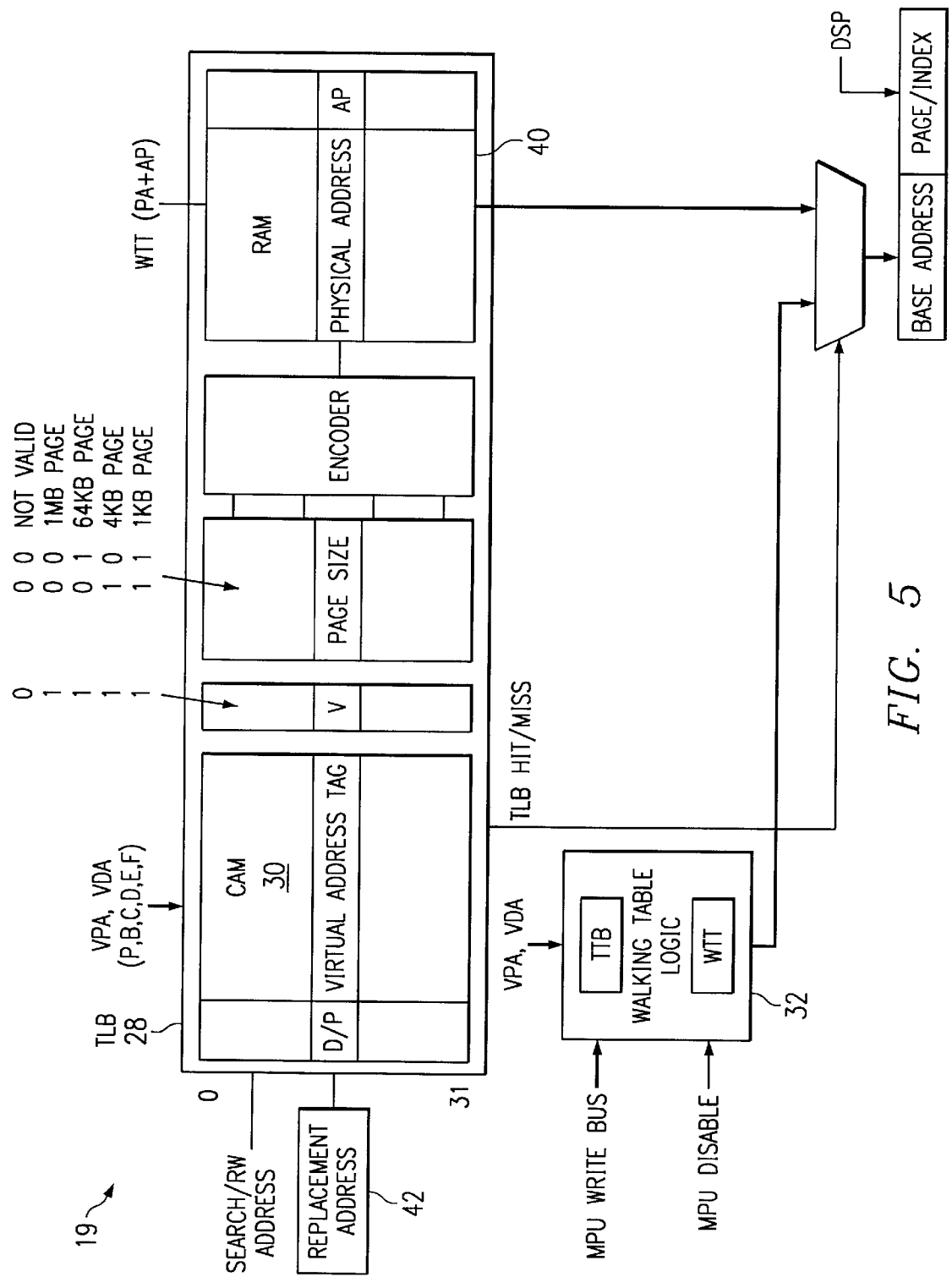
FIG. 5 illustrates a block diagram of the MMU.

The MMU 19 is shown in greater detail in FIG. 5. The MMU 19 performs the virtual address to physical address translations and performs permissions checks for access to the external memory interface. The MMU 19 provides the flexibility and security required by an operating system to manage a shared physical space between the DSP 10 and an another processing unit.

The MMU includes the TLB 28 and walking table logic 32. In operation, the MMU 19 receives virtual program (instruction) addresses (VPAs) and virtual data addresses (VDAs) from the DSP core 12. The virtual addresses are analyzed by CAM 30 of the TLB 28. If the upper bits of the virtual address is stored within CAM 30, a TLB "hit" occurs. The address in the CAM 30 at which the hit occurred is used to access TLB RAM 40, which stores a physical base address (upper level bits) for each corresponding entry in the CAM 30. Hence, if the virtual address is stored at location "20" of CAM 30, the associated physical address can be obtained from location "20" of RAM 40. The physical base address bits from RAM 40 are then concatenated with page index bits (the lower level bits of the virtual address from the DSP core 12) to generate the complete physical address for accessing the external memory 20. In the preferred embodiment, the comparison for each CAM entry is done with the 5, 9, 13, and 15 upper bits of the DSP address, depending upon a page size code (00=1 Mbyte page, 01=64 Kbyte page, 10=4 Kbyte page and 11=1 Kbyte page). Hence, a 1 Mbyte page need only match on the five upper bits, a 64 Kbyte page need only match on the upper nine bits and so on. This is to allow different page sizes to be accommodated by a single CAM; naturally, page sizes other than those shown in FIG. 5 could be used in different implementations.

CAM 30 and RAM 40 can store other information on the virtual addresses. RAM 40 stores permission bits (AP) for the virtual address, which can specify, for example, whether a location is read-only or otherwise protected. These bits can be used to control accesses to certain regions of the external memory 20. When the DSP attempts to access an address with inconsistent AP bits (for example, if the DSP attempts to write to a read only section of memory), the external memory interface 18 can generate an interrupt, which may be processed by a DSP error handling routine.

If the virtual address from the DSP core 12 is not found in CAM 30, a TLB "miss" occurs. In this case, the walking table logic 32 is used to find the base address for the physical address associated with the virtual address in tables located in external memory.

Figure 6:
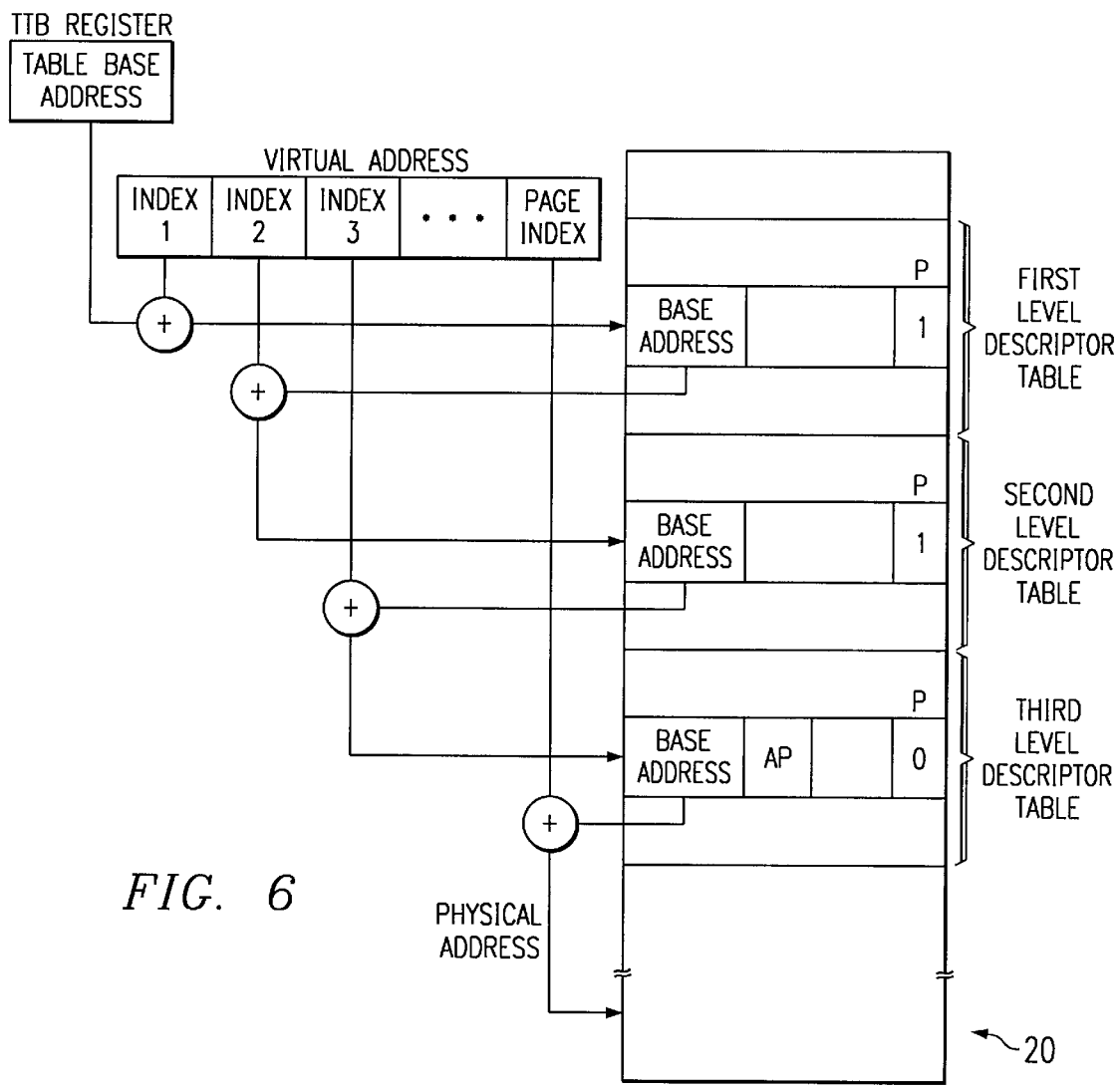
FIG. 6 illustrates the operation of the walking table logic for section of the MMU.

In FIG. 6, the derivation of a physical address by the walking table logic in the event of a TLB miss. Walking table logic methods are well known in the art and FIG. 6 provides a basic description of the process. The TTB register of the walking table logic 32 holds an address which points to a boundary of a first level descriptor table stored in the external memory 20. The virtual address from the processing core 12 has several index fields, the number and position of which may vary depending upon the page type associated with the virtual address. The table base address and index1 from the virtual address are concatenated to identify a location in the first level descriptor table. This location will provide the walking table logic 32 with a base address and a P bit which informs the walking table logic whether the base address points to the physical memory location associated with the virtual address or whether it points to a lower level descriptor table. In the illustration of FIG. 6, the location provides a base address to the second level descriptor table in the external memory 20.

This base address is concatenated with index2 from the virtual address to point to a location within the second level descriptor table. The location provides another base address and another P bit. In the illustration, the P bit indicates that the associated base address points to a location in a third level descriptor table. Thus, the base address is concatenated with index3 from the virtual address to point to a location within the third level descriptor table. This location provides a base address and an associated P bit which indicates that the base address is associated with the desired physical address. The location also includes the permission bits associated with the physical address Thus, the base address is concatenated with the page index from the virtual address to access the external memory.

It should be noted that while the example uses three descriptor tables to identify the base address of the desired physical address, any number of table could be used. The number of tables used to determine a physical address may be dependent upon the page size associated with the physical address.

The base address used to form the physical address and the permission bits are stored in the WTT register of walking table logic 32. The WTT register is used to load the CAM 30 with the virtual address and the RAM 42 with the associated base address and permission bits at a location determined by replacement address circuitry 42. Replacement address circuitry 42 could generate random addresses or cyclic addresses.

The present invention provides significant advantages over the prior art. Virtual addressing allows the DSP to work with a large address space on an external memory which can be shared with any processing unit, such as a microprocessor or a second DSP. Local memory accessed through physical addressing provides high speed access to memory which is isolated from other circuits in the system. Allowing access to both external memory through virtual addressing and local memory through physical addressing results in a more flexible DSP.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A digital signal processor comprising:
   a local memory;
   an interface for connecting to an external memory;
   a processing core capable of generating virtual addresses to address simultaneously a first memory location within said local memory and a second memory location within said external memory using different ones of said virtual addresses; and
   a memory management unit coupled to said interface and said processing core for receiving said virtual addresses from said processing core and translating said virtual addresses to physical addresses associated with said external memory.

2. The digital signal processor of claim 1 where said processing core addresses said local memory directly.

3. The digital signal processor of claim 1 wherein said memory management unit comprises a translation lookaside buffer.

4. The digital signal processor of claim 3 wherein said translation lookaside buffer includes a content addressable memory.

5. The digital signal processor of claim 3 wherein said memory management unit further comprises walking table logic.

6. The digital signal processor of claim 5 wherein said walking table logic comprises a translation table base register for pointing to a translation table in said external memory.

7. The digital signal processor of claim 6 wherein said walking table logic comprises a register for storing a base address derived from said translation table.

8. The digital signal processor of claim 1 and further comprising an instruction cache memory coupled to said processing core.

9. A digital signal processor comprising:
   an interface for connecting to an internal memory and an external memory;
   a processing core; and
   a memory management unit coupled to said interface and said processing core for receiving simultaneously at least two different virtual addresses from said processing core for one of said local memory, said external memory and said local memory and said external memory and translating said virtual addresses to physical addresses associated with said external memory.

10. The digital signal processor of claim 9 wherein said memory management unit comprises a translation lookaside buffer.

11. The digital signal processor of claim 9 wherein said memory management unit further comprises walking table logic.

12. The digital signal processor of claim 11 wherein said walking table logic comprises a translation table base register for pointing to a translation table in said external memory.

13. The digital signal processor of claim 9 and further comprising a local memory coupled to said processing core.

14. The digital signal processing of claim 9 and further comprising an instruction cache memory coupled to said processing core.

15. A method of performing memory accesses in a digital signal processor comprising:
   generating virtual addresses in a processing core to address simultaneously, using different ones of said virtual addresses at least one memory location within a local memory and at least one memory location within an external memory; and
   receiving said virtual addresses associated with the external memory in a memory management unit and translating said virtual addresses to physical addresses associated with said external memory.

16. The method of claim 15 and further comprising the step of directly receiving addresses from said processing core in said local memory.

17. The method of claim 15 and further comprising the step of identifying cached addresses in a translation lookaside buffer.

18. The method of claim 17 and further comprising the step of determining an address through reference to one or more tables stored in said external memory if a virtual address is not cached in said translation lookaside buffer.

19. A digital signal processor comprising:
   a local memory;
   an interface for connecting to an external memory;
   a processing core capable of generating at least two virtual addresses at the same time to address multiple memory locations within one of said local memory, said external memory, and a memory location said local memory and said external memory, using different ones of said virtual addresses;

a memory management unit coupled to said interface and said processing core for receiving said virtual addresses from said processing core and translating said virtual addresses to physical addresses associated with said external memory.

20. A method of performing memory accesses in a digital signal processor comprising:

generating virtual addresses in a processing core to address simultaneously at least two memory locations within a local memory and at least two memory locations within an external memory, using different ones of said virtual addresses;

receiving said virtual addresses associated with the external memory in a memory management unit and translating said virtual addresses to physical addresses associated with said external memory.

21. A digital signal processor comprising:

a local memory including a data memory and an instruction memory, said instruction memory including an instruction cache and at least one of a random access memory (RAM) and a read only memory (ROM);

an interface for connecting to an external memory, using different ones of said virtual addresses;

a processing core capable of generating virtual addresses to address simultaneously at least one memory location in each of said local memory and said external memory; and a memory management unit coupled to said interface and said processing core for receiving said virtual addresses from said processing core and translating said virtual addresses to physical addresses associated with said external memory.

22. The digital signal processor of claim 21, wherein said data memory includes a data cache and a random access memory (RAM).

* * * * *